United States Patent [19]
Leitz

[11] 3,806,725
[45] Apr. 23, 1974

[54] APPARATUS FOR AUTOMATIC TRACKING OF PUPIL OF EYE

[75] Inventor: Ludwig Leitz, Wetzlar, Germany

[73] Assignee: Ernst Leitz GmbH, Wetzlar, Germany

[22] Filed: Jan. 15, 1973

[21] Appl. No.: 323,343

[30] Foreign Application Priority Data
Jan. 18, 1972 Germany.......................... 2202172

[52] U.S. Cl.................... 250/201, 250/203, 250/221
[51] Int. Cl. ...... G01j 1/20, H01j 39/12, G05d 3/00
[58] Field of Search...................... 250/201, 203, 221

[56] References Cited
UNITED STATES PATENTS
3,678,283    7/1972   Labaw............................ 250/203 R Primary Examiner—Archie R. Borchelt
Assistant Examiner—T. N. Grigsby
Attorney, Agent, or Firm—Krafft & Wells

[57] ABSTRACT

An improved apparatus for the automatic tracking of the pupil of an optical device upon a relative lateral movement between the pupil of an observer's eye and the pupil of the optical device, wherein a sighting mechanism (23,24) is effective between the observer (22) and the optical device (20) and operates on the basis of photoelectric scanning, the electrical output signals of the sighting mechanism (23) supply a servo drive system (25) which is connected after the sighting mechanism for tracking the pupil (21) of the optical device (20).

4 Claims, 6 Drawing Figures

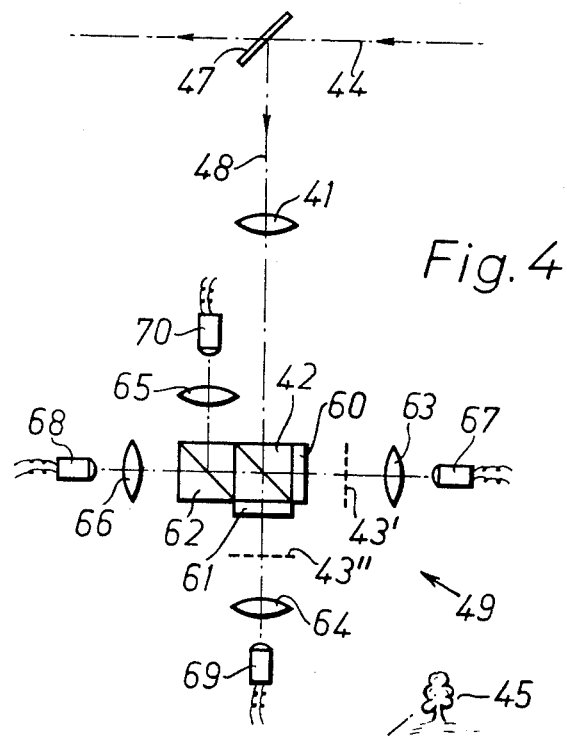
Fig.4
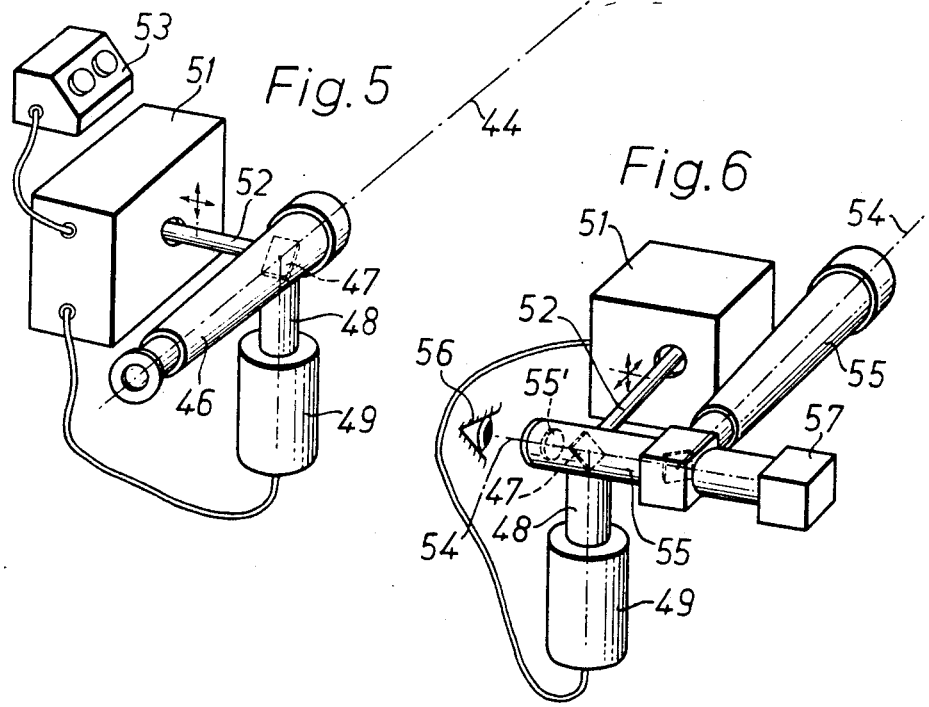
Fig.5
Fig.6

3,806,725

APPARATUS FOR AUTOMATIC TRACKING OF PUPIL OF EYE

CROSS REFERENCES TO RELATED APPLICATIONS

Applicant claims priority under 35 U.S.C. 119 for Application P 22 02 172.3, filed Jan. 18, 1972 in the Patent Office of the Federal Republic of Germany.

The following U.S. Patent Application, of the assignee of the present invention, is incorporated by reference: Ser. No. 323,376 of Hermann Eisenkopf and Ludwig Leitz, filed on the same day as the present invention and having the title, "Apparatus for Stabilizing a Line of Sight."

This incorporated application of Eisenkopf et al. discloses the apparatus for deriving the electrical signals with the aid of an optical grating as a correlator, the follower system and the apparatus for adjusting the mechanism useful in the present invention.

BACKGROUND OF THE INVENTION

The present invention is related to a device for the automatic tracking of the pupil of an optical device upon a relative lateral movement between the pupil of an observer's eye and the pupil of the optical device.

When optical observation mechanisms are used on moving vehicles, the difficulty occurs that, during irregular movements of the vehicle, for example in high seas or in case of gusty winds, the line of sight between the pupil of the optical device and the pupil of the observer's eye is lost or is laterally displaced to such an extent that the device can no longer be utilized. Many attempts have been made to overcome this deficiency. Thus, it has been suggested to insert in the beam path between the optical device and the observer a television unit so that the observer always has a large field of observation available. However, this solution has the disadvantage that it is relatively expensive with respect to costs and space requirements. Moreover, part of the information is lost, when a black and white television system is used, due to the missing colors. Another solution uses an optical joint between the optical device and its ocular, so that the ocular is, so to speak, rigidly connected with the observer's head. In this connection, it is disadvantageous that, on the one hand, the observer's freedom of movement is considerably restricted, but on the other hand, a movement of the observer in the direction of the optical beam path results in additional difficulties.

Finally, the ocular of the optical device can be rigidly coupled, as it were, with the observer's head, as mentioned above, and can be connected with the optical device by means of a bundle of optical fibers. Not considering the fact that such an arrangement makes it impossible to use a different device for short term observation with the same eye, the expenses incurred for such a fiber-optical system are, after all, considerable.

SUMMARY OF THE INVENTION

Having in mind the limitations of the prior art, the present invention is based on the problem of providing a device of the aforementioned type, wherein the disadvantages thereof are avoided. In particular, the novel device is realizable with a relatively minor expenditure, and it permits the observer free movement relative to the optical device to be employed in the observation.

This problem is solved, according to the present invention, in an apparatus of the type described above, by providing a sighting mechanism effective between the observer and the optical device which is on the basis of photoelectric scanning, and a servo drive mechanism, supplied with the electrical output signals of the sighting device, for tracking the pupil of the optical device is connected after this sighting mechanism. The sighting unit can be embodied as a collimator, preferably as an autocollimator. However, it is also possible to provide the sighting unit advantageously with a grating as an optical correlator, this grating being followed by photoelectric receivers producing the electrical control signals.

BRIEF DESCRIPTION OF THE DRAWINGS

The novel device will be described hereinbelow in an example with reference to the schematic drawings wherein:

FIG. 4 is a schematic plan view showing the device for scanning two gratings to perform a two-coordinate measurement as disclosed in application Ser. No. 323,376;

FIG. 5 is a perspective view illustrating the device of application Ser. No. 323,376 for stabilizing the line of sight between an object and an optical viewing system using the device of FIG. 4; and FIG. 6 is a perspective view showing the device of application Ser. No. 323,376 for stabilizing the line of sight between an optical instrument and part of the face of the observer.

DESCRIPTION OF THE PREFERRED EMBODIMENTS

Figure 1:
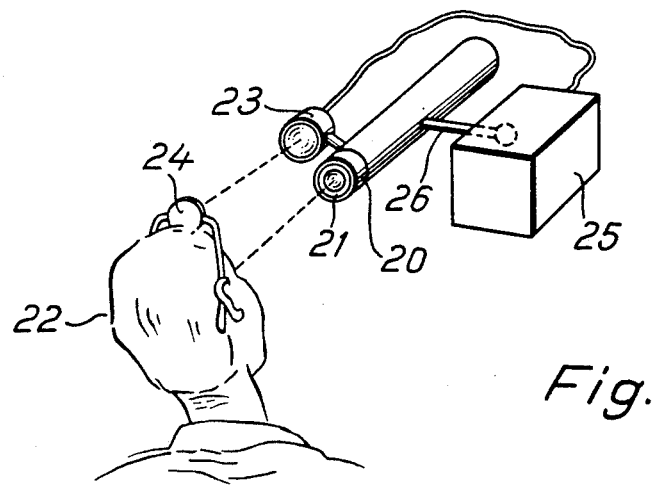
FIG. 1 is a perspective view illustrating a device according to the collimator principle.

In FIG. 1, the pupil of an optical device 20 has the reference numeral 21. This pupil is actuated to follow the pupil of the eye of an observer 22 during a movement of the two pupils relative to each other at right angles to their junction line. A fotoelectric autocollimator 23 as disclosed for instance in a prospect CT 167/2 "APS autocollimators" of Hilger & Watts is fixedly joined to the optical device 20 and aims at a triple mirror reflector 24 fixedly connected with the head of the observer 22. The electrical deviation signals, produced at the output of the autocollimator 23 upon a displacement of the reflector 24 and thus the eye pupil of the observer 22 at right angles to the line of sight of the autocollimator, are fed to a logic evaluation circuit with a servo mechanism 25 connected thereto. The latter shifts, via a control arm 26, the pupil 21 of the optical device 20 until it has been readjusted with respect to the displaced eye pupil of the observer 22.

Figure 2:
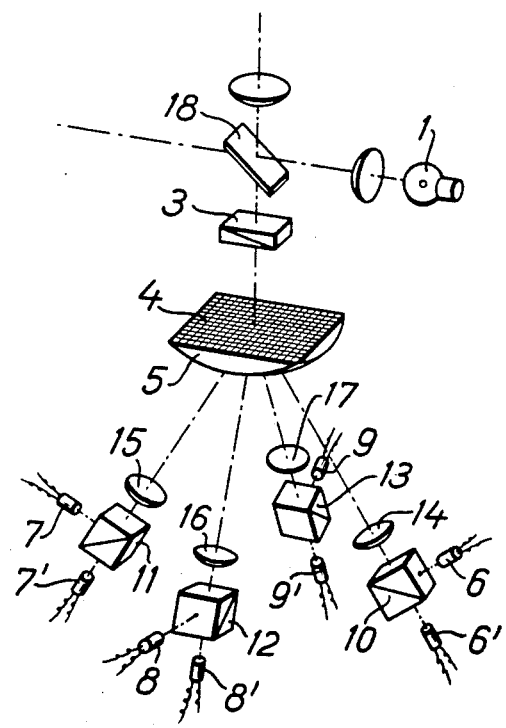
FIG. 2 is a schematic view showing a device according to the correlator principle which can be incorporated into FIG. 1.

The device according to the correlator principle as shown in FIG. 2 can take the place of the autocollimator 23 (FIG. 1). A lamp 1 produces a directional beam which is projected, via a beam splitter 18, onto the triple mirror reflector 24 (FIG. 1). After reflection, the directional beam then passes via a Wollaston prism 3 to a pyramidal grating disk 4 mounted to a lens element 5. The polarized beam components are split at the prism 3 in the direction of the diagonal of the base surfaces of the grating pyramids and the splitting amounts, in the plane of the grating, to $(P/4)\sqrt{2}$, wherein P denotes the side length of the base surfaces. The components proper cover, in each case, respectively at least several grating pyramids entirely. The beam components produced on the grating disk are collected via condensers 14, 15, 16, 17 and polarizing beam splitters 10, 11, 12, 13 at photoelectric receiver pairs 6, 6'; 7, 7'; 8, 8'; 9, 9' so that, upon movement of the beam relative to the grating disk 4, the pairs of receivers disposed diagonally with respect to each other, e.g., 8, 9; 8', 9', yield two push-pull signal pairs shifted with respect to each other by 90° as disclosed in application Ser. No. 283,967, filed Aug. 28, 1972. For instance receiver 8 yields a 0° phase, receiver 8' a 90° phase, receiver 9 a 180° phase and receiver 9' a 270° phase. The signals of respectively two of such receiver pairs are associated with respectively one coordinate direction of the movement, wherein the direction of the 90° phase shift carries information regarding the direction of the movement. The push-pull signals, connected differentially in order to suppress equal components, are utilized for tracking purposes just as in the device of FIG. 1.

Figure 3:
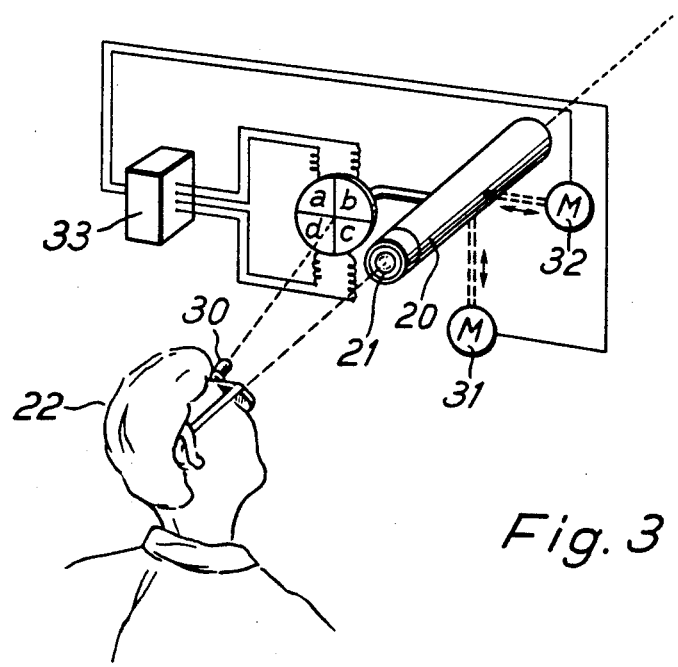
FIG. 3 is a perspective view showing another modification of the novel device of FIG. 1.

Additional modifications are possible. Thus, according to FIG. 3, it is possible, for example, to provide together with the pupil-determining ocular 21 (FIG. 1) of the optical device 20 an arrangement of four large area photoelectric receivers, subdivided into quadrants, $a, b, c, d$. A fine light beam is directed on to these receivers, which beam is produced by a light spot projector 30 attached to the observer's head. A servo system connected thereafter contains two drive mechanisms, e.g., electric motors 31, 32, associated with the coordinate directions of the quadrant system of photoelectric receivers. These electric motors are supplied with energy via a logic circuit 33 in correspondence with the respective deviation of the light spot, based on the point of intersection of the coordinates, and move the pupil-determining ocular 21 into such a position that the light spot produced by the marker projector is returned to the origin of the coordinates.

The four large area receivers $a, b, c, d$ can also be composed of groups of receivers. This is advantageous especially when the spatial dimension of the light-sensitive arrangement must be relatively large, since the extent of this dimension is dependent in practice on the size of the relative motions between observer and ocular to be adjusted.

The impinging beams for the observation device and for the correlator can also be intertwined with each other. In such a case, it is advantageous in order to avoid a weakening of the light for the visual observation to employ differing spectral ranges for observation and the correlator.

In the device of FIG. 4, illustrated schematically as an example for a measuring head, an objective 41 reproduces an object, not shown, on two gratings 43', 43'' via a polarizing beam splitter 42. These gratings are formed so that reflecting markers are provided on a transparent carrier. The portions of the beam penetrating the gratings 43', 43'' pass, via condenser lenses 63, 64, to photoelectric receivers 67, 69. The portions of the beam reflected from the markers of the gratings are fed, via the beam splitter 42, another polarizing beam splitter 62, as well as condensers 65, 66, to photoelectric receivers 68, 70. As can be seen from the drawing, respectively one quarter-wave plate 60, 61 is inserted between the beam splitter 42 and the gratings 43', 43'', so that the polarization characteristics of the beam portions reflected from the gratings are exactly transposed with respect to the incident beam portions. By means of this arrangement, in a low-loss manner, equally strong push-pull signals are obtained at the outputs of the pairs of receivers 67, 68 and 69, 70, from the portions of the object image respectively reflected from and transmitted by the gratings 43', 43''. These push-pull signals are correlated with the coordinate directions. With a firm relative position of the object and the pairs of photoelectric receivers, the push-pull signals have a repetition rate which is only proportional to the motion velocity of a (preferably defined) movement of the gratings in their planes. In contrast thereto, when the object is moving, repetition rates are obtained which, depending on the direction of motion of the object, are proportional either to the sum or to the difference of the object and grating velocities in the respective coordinate directions. By comparison with signals only derived from the movements of the gratings, the magnitude and direction of the object movement can be determined from these signals in a conventional manner, for example by means of phase-sensitive rectifiers as comparison stages.

If the location is to be measured, the number of periods traversed are counted at the outputs of the comparison stages, taking into account the directional information which is likewise available.

In FIG. 5, the line of sight to be stabilized is denoted by 44. This line connects an object 45 with a viewing optic 46. By means of a beam splitter 47 disposed in this optical viewing system 46, a portion 48 is branched off from the beam for controlling an optical correlator 49, for example according to FIG. 4. This correlator is connected by an electronic evaluating circuit as disclosed in U.S. Pat. application Ser. No. 311,775 with an adjusting mechanism 51 as disclosed in L. M. Biberman-Reticles, p. 45, coupled therewith. The latter moves the optical viewing system 46, via a control arm 52, until the line of sight 44 extends again between the optical viewing system 46 and the object 45. An apparatus 53 serves for indicating measured values derived from the adjusted variable of the mechanism 51, with respect to magnitude, direction and/or velocity of the relative motion of the object 45 with regard to the optical viewing system 46.

The modification illustrated schematically in FIG. 6, serves for stabilizing the line of sight 54 between an optical instrument 55 and the eye 56 of an observer. In this case, an infrared radiation source 57 is provided which is fixedly connected with the instrument 55 and illuminates the eye 56 in such a manner that it is imaged via a beam splitter 47 into an optical correlator 48. The evaluation of the output signals of the correlator 49 is effected in the same manner as the device described in connection with FIG. 5, and the resetting of the ocular 55' is such that the pupil of the instrument 55 is always opposite the observer's eye, so that the pupil of the instrument is congruent with the pupil of the eye. This is important for viewing from moving vehicles.

I claim:

1. In an apparatus for the automatic tracking of the pupil of an optical device upon the relative movement between the pupil of an observer's eye and said pupil of the optical device the improvement comprising:
   a. the optical device having a pupil and said observer establishing a first line of sight;
   b. means for sighting, fixedly joined to said optical device and to the head of said observer establishing a second line of sight;
   c. means producing a beam of light between said means fixedly joined and operating on the basis of photoelectric scanning to produce position defining output signals; and
   d. a servo drive system activated by said output signals for tracking said pupil of the optical device in alignment with said second line of sight.

2. The apparatus of claim 1, wherein said means for sighting is a collimator.

3. The apparatus of claim 2, wherein said collimator is an autocollimator.

4. The apparatus of claim 1, wherein said means for sighting is a grating functioning as an optical correlator and photoelectric receiver means actuated by said grating to produce said position defining output signals.

* * * * *